（12）United States Patent
Wang et al.

(10) Patent No.: US 7,139,111 B1
(45) Date of Patent: Nov. 21, 2006

(54) MICROMIRRORS FOR MICRO-ELECTRO-MECHANICAL SYSTEMS AND METHODS OF FABRICATING THE SAME

(75) Inventors: Shen-Ping Wang, Keelung (TW); Alan Lee, Taipei (TW); Chia-Chiang Chen, ShinChu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 29 days.

(21) Appl. No.: 11/117,155

(22) Filed: Apr. 28, 2005

(51) Int. Cl.
*G02B 26/00* (2006.01)
*B05D 5/06* (2006.01)

(52) U.S. Cl. .................. 359/290; 359/291; 427/166

(58) Field of Classification Search ............. 359/290, 359/291, 292, 293, 295, 298, 223, 224, 320, 359/322; 427/166, 168
See application file for complete search history.

(56) References Cited

U.S. PATENT DOCUMENTS

| | | | |
|---|---|---|---|
| 6,778,315 B1 | 8/2004 | Guo et al. | 359/290 |
| 6,800,210 B1 | 10/2004 | Patel et al. | 216/2 |
| 7,022,249 B1* | 4/2006 | Valette | 216/24 |
| 7,023,606 B1* | 4/2006 | Huibers | 359/290 |
| 7,057,794 B1* | 6/2006 | Wang et al. | 359/290 |
| 2004/0223240 A1 | 11/2004 | Huibers | 359/850 |

* cited by examiner

*Primary Examiner*—Hung X. Dang
*Assistant Examiner*—Tuyen Tra
(74) *Attorney, Agent, or Firm*—Thomas, Kayden, Horstemeyer & Risley

(57) ABSTRACT

A micromirror for micro-electro-mechanical systems. The micromirror comprises a pad layer, a doped aluminum layer containing 0.002 wt % to 0.3 wt % of silicon overlying the pad layer and a protective layer overlying the doped aluminum layer.

20 Claims, 4 Drawing Sheets

US 7,139,111 B1

MICROMIRRORS FOR MICRO-ELECTRO-MECHANICAL SYSTEMS AND METHODS OF FABRICATING THE SAME

BACKGROUND

The present invention relates to micromirrors for micro-electro-mechanical systems (MEMSs). More particularly, the present invention relates to micromirrors using doped aluminum layer and methods of fabricating the same.

New advancements in projection systems utilize an optical semiconductor known as a digital micromirror device. A digital micromirror device chip is one of the most sophisticated light switches in the field. It contains an array of 750,000 to 1.3 million pivotally-mounted microscopic mirrors. Each mirror may measure less than ⅕ of the width of a human hair and corresponds to one pixel in a projected image. The digital micromirror device chip can be combined with a digital video or graphic signal, a light source and projector lens so that the micromirrors reflect an all-digital image onto a screen or other surface.

US patent publication No. 2004/0223240 discloses micromirror arrays having a reflective layer comprising gold, silver, titanium, or aluminum. The micromirror optimizes the contrast ratio of the micromirror array so that when the micromirrors are in their 'off' state they send minimal light to the spatial region where light is directed when micromirrors are in their 'on' state.

U.S. Pat. No. 6,778,315 discloses a Micro mirror structure with flat reflective coating. Each mirror includes a substrate, a diffusion barrier layer located above the substrate, and a reflective layer located above the diffusion barrier layer. The reflective layer comprises gold, silver or aluminum.

U.S. Pat. No. 6,800,210 discloses a method for making a micromechanical device by removing a sacrificial layer with multiple sequential etchants. The micromechanical device uses metal such as gold, silver or aluminum as reflective layer.

Conventional micromirrors often include hillocks (raised feature or bumps) or voids in the reflective layer. The hillocks or voids may however cause artifacts or distortions in the projected image. Conventional micromirrors also tend to have unstable light-reflecting characteristics, possibly resulting from large surface roughness of the reflective layer.

SUMMARY

Accordingly, an object of the invention is to provide a micromirror having improved light-reflecting characteristics.

Another object of the invention is to provide a micromirror to reduce surface roughness.

Still another object of the invention is to provide a micromirror having a reflective layer which is substantially devoid of precipitates.

In accordance with the objects, an embodiment of micromirror for micro-electro-mechanical systems comprises a pad layer; a doped aluminum layer containing 0.002 wt % to 0.3 wt % of silicon overlying the pad layer; and a protective layer overlying the doped aluminum layer.

Another embodiment of micromirror for micro-electro-mechanical systems comprises a pad layer; a dopant-containing aluminum layer overlying the pad layer, the dopant is selected from a group consisting of silicon, neodymium, tantalum, cobalt, nickel, chromium, molybdenum, and titanium or combination thereof; and a protective layer overlying the dopant-containing aluminum layer. The dopant may have a concentration of about 0.01 wt % to 2 wt %.

In accordance with the objects, one embodiment of a method of fabricating a micromirror for micro-electro-mechanical systems is provided. A pad layer is formed followed by forming a dopant-containing aluminum layer on the pad layer, the dopant is selected from a group consisting of silicon, neodymium, tantalum, cobalt, nickel, chromium, molybdenum, and titanium or combination thereof. A protective layer is then deposited overlying the dopant-containing aluminum layer.

DESCRIPTION

Figure 1:
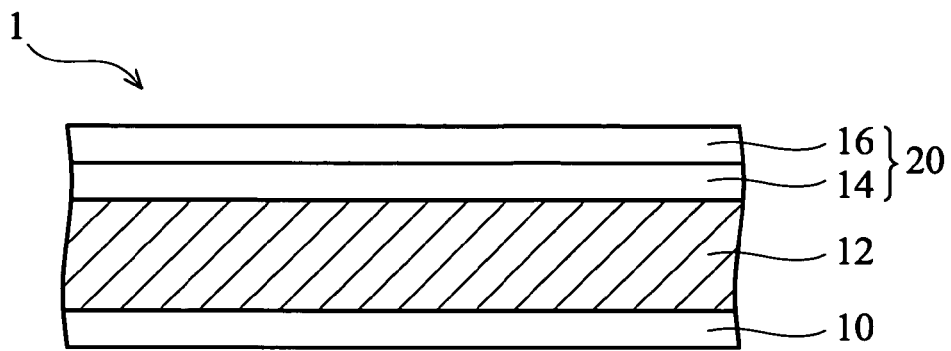
FIG. 1 is a cross section of an embodiment of a micromirror for micro-electro-mechanical systems.

FIG. 1 is a cross section of an embodiment of a micromirror for micro-electro-mechanical systems. The micromirror 1 comprises a pad layer 10, a doped aluminum layer 12 overlying the pad layer and a protective layer 20 consisting of a titanium layer 14 and a titanium nitride layer 16. The pad layer 10 may comprise silicon oxide such as plasma enhanced silicon oxide (PEOX) and have a thickness between about 300 angstroms and 500 angstroms. The pad layer 10 protects the doped aluminum layer 12 from oxidation or damage. Doping a dopant, for example silicon, into aluminum, may reduce the surface roughness of the doped aluminum layer 12. It is likely that the higher the concentration of silicon, the smaller the surface roughness of the doped aluminum layer 12, thereby improving light-reflecting characteristics. The silicon doped concentration, however, exceeds its solubility at an operational temperature of, for example 0° C. to 200° C., in a micro-electro-mechanical system, thus, silicon particles may precipitate on the surface of the doped aluminum layer 12, potentially resulting in undesirable roughness problems. In one embodiment, the doped aluminum layer may contain 0.002 wt % to 0.3 wt %, preferably 0.1 wt % to 0.25 wt %, of silicon at room temperature about 25° C. The doped aluminum layer 12 may have a thickness of about 2000 angstroms to 3000 angstroms. In one embodiment of the invention, the doped aluminum layer 12 is preferably a copper-free aluminum layer.

The protective layer 20 comprises, but is not limited to, a composite layer of the mentioned titanium layer 14 and titanium nitride layer 16. An embodiment of protective layer 20 may alternately comprise a single titanium layer or a single titanium nitride layer. Moreover, the protective layer 20 may have a thickness of about 100 angstroms to 800 angstroms.

An embodiment of the mirror may alternately comprises a doped aluminum layer containing a dopant selected from a group consisting of neodymium, tantalum, cobalt, nickel, chromium, molybdenum, and titanium or combination thereof. That is, at least neodymium, tantalum, cobalt, nickel, chromium, molybdenum, or titanium may replace silicon as a dopant of the doped aluminum layer. The doped concentration of neodymium, tantalum, cobalt, nickel, chromium, molybdenum, or titanium is about 0.01 wt % to 2 wt %.

Figure 2:
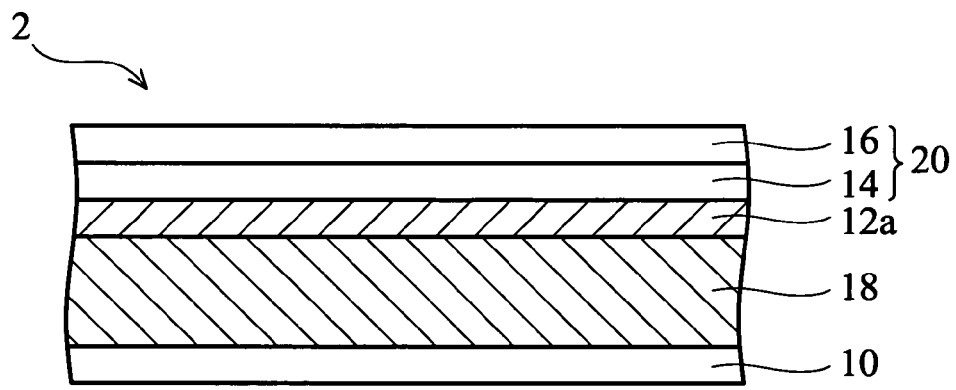
FIG. 2 is a cross section of an embodiment of a micromirror for micro-electro-mechanical systems.

Alternately, an embodiment of a micromirror for micro-electro-mechanical systems is shown in FIG. 2. The micromirror 2 comprises pad layer 10 and protective layer 20 being the same as those in FIG. 1. The micromirror 2 further comprises a composite reflective layer consisting of the doped aluminum layer 12a and a pure aluminum layer 18 thereunder. The reflective layer may have a thickness of about 2000 angstroms to 3000 angstroms. The pure aluminum layer 18 may substantially reduce or eliminate the formation of pits in the reflective layer.

Figure 3:
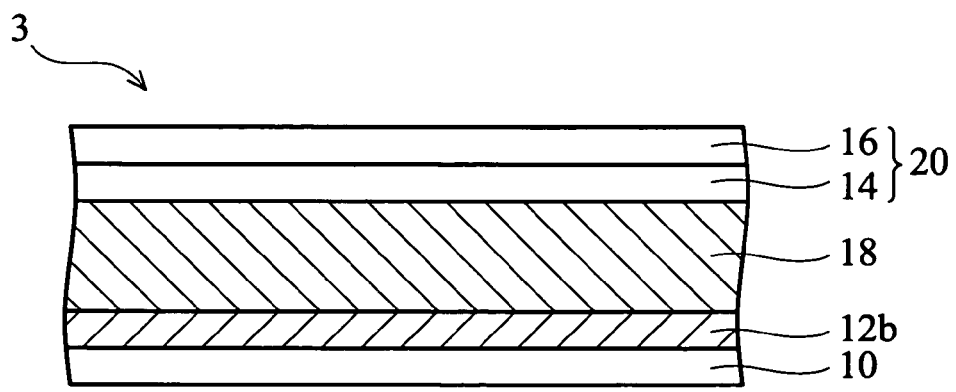
FIG. 3 is a cross section of an embodiment of a micromirror for micro-electro-mechanical systems.

FIG. 3 is a cross section of another embodiment of a micromirror for micro-electro-mechanical systems. The micromirror 3 comprises pad layer 10 and protective layer 20 being the same as those in FIG. 1. The micromirror 3 further comprises a composite reflective layer consisting of the doped aluminum layer 12b and a pure aluminum layer 18 thereon. The reflective layer may have a thickness of about 2000 angstroms to 3000 angstroms.

Figure 4:
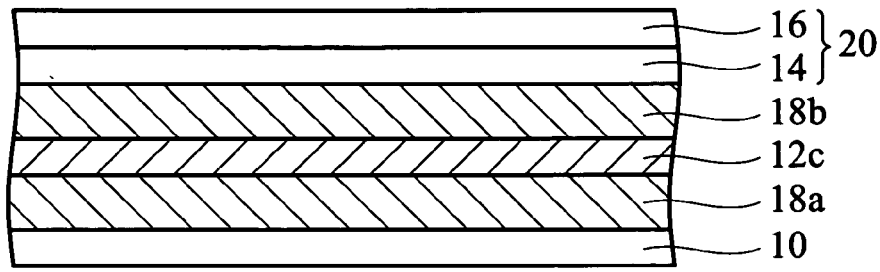
FIG. 4 is a cross section of an embodiment of a micromirror for micro-electro-mechanical systems.

FIG. 4 is a cross section of an embodiment of a micromirror for micro-electro-mechanical systems. The micromirror 4 comprises pad layer 10 and protective layer 20 being the same as those in FIG. 1. The micromirror 4 further comprises a composite reflective layer consisting of two pure aluminum layers 18a and 18b and the doped aluminum layer 12c interposed therebetween.

Figure 5:
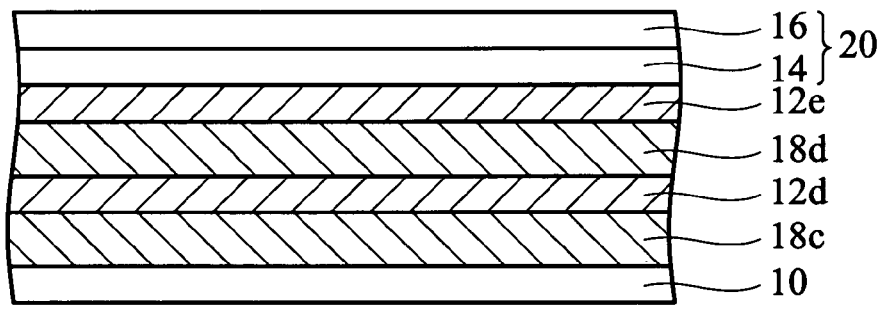
FIG. 5 is a cross section of an embodiment of a micromirror for micro-electro-mechanical systems.

Alternately, an embodiment of a micromirror for micro-electro-mechanical systems is shown in FIG. 5. The micromirror 5 comprises pad layer 10, protective layer 20 being the same as those in FIG. 1. The micromirror 5 further comprises a composite reflective layer consisting of pure aluminum layers 18b and 18c and doped aluminum layers 12d and 12e. The pure aluminum layer 18c, doped aluminum layer 12d, pure aluminum layer 18d, and doped aluminum layer 12e are sequentially formed on the pad layer 10 by physical vapor deposition.

Figure 6:
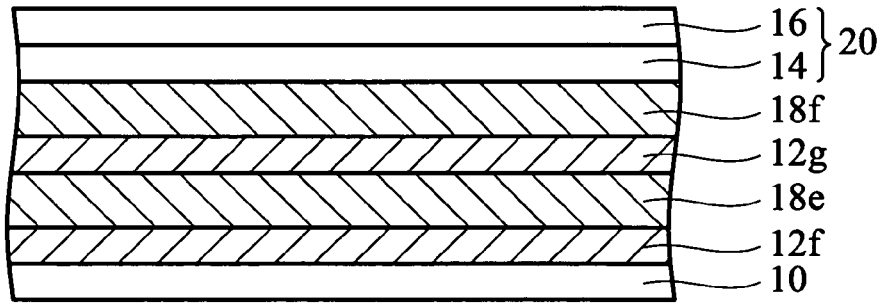
FIG. 6 is a cross section of an embodiment of a micromirror for micro-electro-mechanical systems.

FIG. 6 is a cross section of another embodiment of a micromirror for micro-electro-mechanical systems. The micromirror 6 comprises pad layer 10 and protective layer 20 being the same as those in FIG. 1. The micromirror further comprises a composite reflective layer consisting of doped aluminum layers 12f and 12g and pure aluminum layers 18e and 18f. The doped aluminum layer 12f, pure aluminum layer 18e, doped aluminum layer 12g, and pure aluminum layer 18f are sequentially formed on the pad layer 10 by physical vapor deposition.

The pure aluminum layers mentioned above may substantially reduce or eliminate the formation of pits in the reflective layer.

Figure 7:
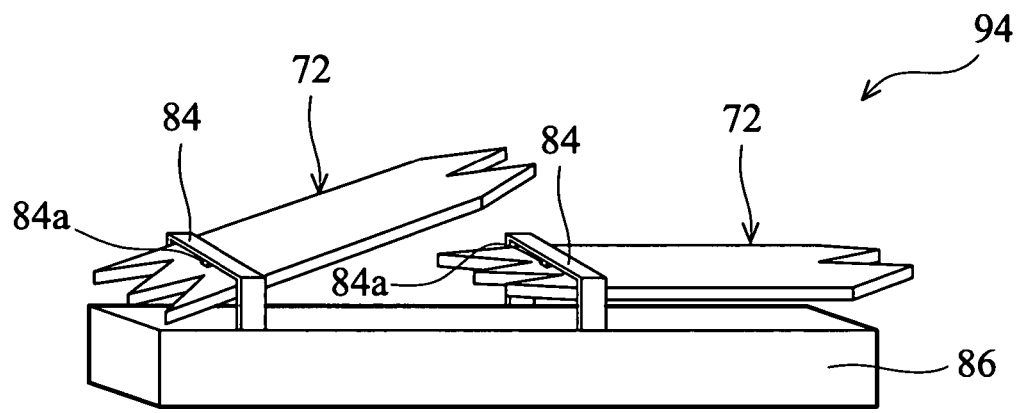
FIG. 7 is a schematic diagram of an embodiment of a pair of micromirrors attached to a transparent substrate.

FIG. 7 is a schematic diagram of an embodiment of a pair of micromirrors attached to a transparent substrate. Each of the micromirrors contains a reflective layer comprising a doped aluminum layer mentioned above.

The assembly 94 may comprise a transparent substrate 86. A hinge 84 is formed on the transparent substrate 86. Each micromirror 72 is secured to the transparent substrate 86 for pivotal movement with respect to the corresponding hinge 84 and the transparent substrate 86 by a hinge support 84a. Fabrication of the assembly 94 can be carried out using conventional techniques known to those skilled in the art.

Figure 8:
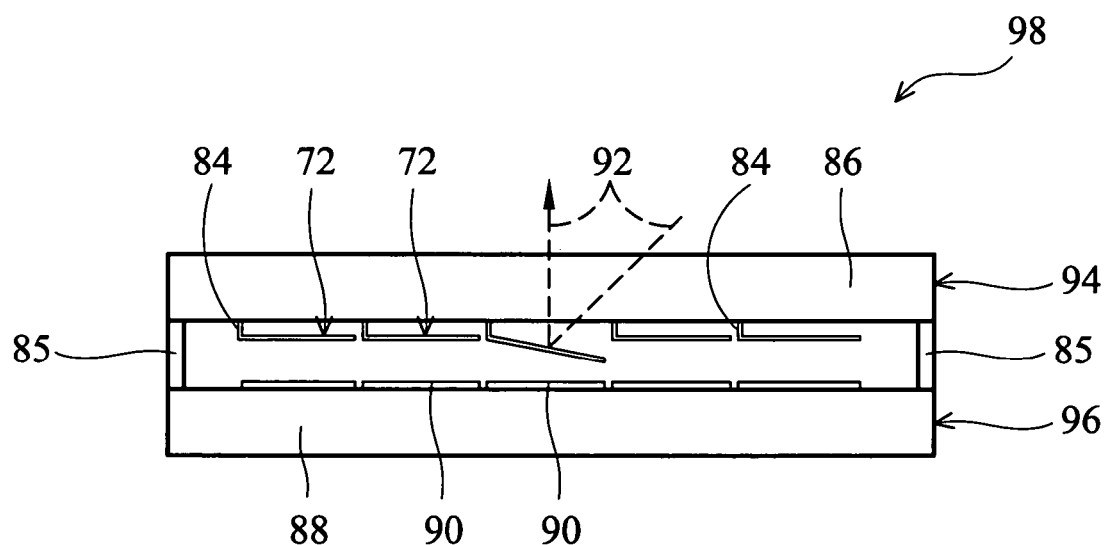
FIG. 8 is a schematic diagram of an embodiment of multiple micromirrors mounted in a digital mirror device.

FIG. 8 is a schematic diagram of an embodiment of multiple micromirrors mounted in a digital mirror device 98. An assembly 96 may comprise a semiconductor device such as, but not limited to, a complementary metal-oxide semiconductor (CMOS) device. Multiple electrodes 90, one for each micromirror 72 of the assembly 94, are formed on the semiconductor device 88. Each of the electrodes 90 communicates with electronic circuitry (not shown) on the semiconductor device 88 so that each electrode 90 may be selectively activated in response to a video or graphic signal. Fabrication of the assembly 96 can be carried out using conventional techniques known to those skilled in the art.

As further shown in FIG. 8, the digital mirror device 98 typically comprises the assembly 94 flipped over and overlying the assembly 96 so the micromirrors 82 of the assembly 94 face and are closet to the respective electrodes 90 of the assembly 96. Spacers 85 are provided so that the micromirrors 72 are set apart the respective electrode so that each micromirror 72 can freely pivot on the corresponding hinge 84 respective to activation of an associated electrode 90.

In operation of the digital mirror device 98, as light 92 is directed onto the micromirrors 72, electrode 90 associated with each micromirror 72 may be activated to cause the micromirror 72 to pivotally move about the corresponding hinge 84. Therefore, depending on whether or not the electrode 90 associated with any particular micromirror 72 has been activated, the light 92 may or may not be reflected from that micromirror 72. Depending on how fast and how often a particular micromirror 72 is deflected by the corresponding electrode 90, the image (pixel) projected by the mirror 72 will appear light or dark on a projection screen (not shown) or other surface. It will be appreciated by those skilled in the art that, due to the reduced surface roughness of the doped aluminum layer in each micromirror 72 as well as the absence precipitates, hillocks, pits, or voids thereof, the micromirrors 72 may project a high-quality image from the digital mirror device 98 onto the projection screen (not shown) or other surface.

Figure 9:
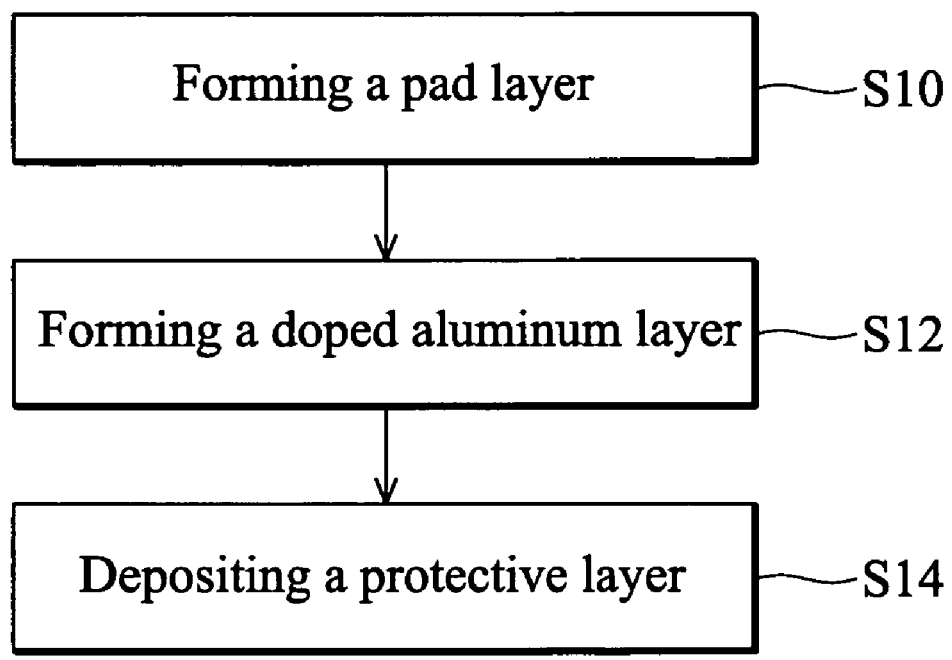
FIG. 9 is a flowchart of an embodiment of a method of fabricating a micromirror for micro-electro-mechanical systems.

FIG. 9 is a flowchart of an embodiment of a method of fabricating a micromirror for micro-electro-mechanical systems. This method comprises steps S10 to S14. First, in step S10 a pad layer is formed. The pad layer may comprise silicon oxide and is formed on a substrate having an amorphous silicon layer (sacrificial layer) thereon by plasma enhanced chemical vapor deposition. In step S12 a doped aluminum layer is formed on the pad layer. The doped aluminum layer is preferably formed by physical vapor deposition (PVD) or sputtering using a doped aluminum or an aluminum alloy target. Alternately, a pure aluminum layer is deposited followed by doping at least one dopant into the pure aluminum layer. The doping method includes ion implantation, chemical reaction or ion diffusion at a thermal ambient of about 20° C. to 560° C.

The dopant is preferably silicon and the doped aluminum layer may contain 0.002 wt % to 0.3 wt %, preferably 0.1 wt % to 0.25 wt %, of silicon at room temperature of about 25° C. The dopant may alternately be selected from a metallic group consisting of neodymium, tantalum, cobalt, nickel, chromium, molybdenum, and titanium or combination thereof. The doped aluminum layer may contain 0.01 wt % to 2 wt % of metal mentioned above.

Next, in step S14 a protective layer is deposited on the doped aluminum layer. The protective layer comprises but not limited to a composite layer of titanium layer and titanium nitride layer. An embodiment of protective may alternately comprise a single titanium layer or titanium nitride layer.

One embodiment of the method further comprises a step of forming a pure aluminum layer overlying the doped aluminum layer after step S12. The pure aluminum layer may contacts with the pad layer. Another embodiment of the method further comprises a step of forming a pure aluminum layer under the doped aluminum layer before step S12. Alternately, one embodiment of the method comprises the steps of forming pure aluminum layers before and after step S12 respectively so that the doped aluminum layer is interposed between the pure aluminum layers.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micromirror for micro-electro-mechanical systems, comprising:
    a pad layer;
    a doped aluminum layer containing 0.002 wt % to 0.3 wt % of silicon overlying the pad layer; and
    a protective layer overlying the doped aluminum layer.

2. The micromirror for micro-electro-mechanical systems as claimed in claim 1, further comprising a pure aluminum layer under the doped aluminum layer.

3. The micromirror for micro-electro-mechanical systems as claimed in claim 1, further comprising a pure aluminum layer overlying the doped aluminum layer.

4. The micromirror for micro-electro-mechanical systems as claimed in claim 3, wherein the pure aluminum layer is contacted with the doped aluminum layer.

5. The micromirror for micro-electro-mechanical systems as claimed in claim 1, further comprising two pure aluminum layers so that the doped aluminum layer is interposed between the pure aluminum layers.

6. The micromirror for micro-electro-mechanical systems as claimed in claim 1, wherein the doped aluminum layer has a thickness of about 2000 angstroms to 3000 angstroms.

7. The micromirror for micro-electro-mechanical systems as claimed in claim 1, wherein the doped aluminum layer contains 0.1 wt % to 0.25 wt % of silicon.

8. The micromirror for micro-electro-mechanical systems as claimed in claim 1, wherein the protective layer is a titanium layer or a titanium nitride layer, or a composite layer comprising titanium and titanium nitride.

9. The micromirror for micro-electro-mechanical systems as claimed in claim 1, wherein the protective layer has a thickness of about 100 angstroms to 800 angstroms.

10. The micromirror for micro-electro-mechanical systems as claimed in claim 1, wherein the pad layer comprises an oxide layer and has a thickness of about 300 angstroms to 500 angstroms.

11. The micromirror for micro-electro-mechanical systems as claimed in claim 1, wherein the doped aluminum layer is a copper-free aluminum layer.

12. A micromirror for micro-electro-mechanical systems, comprising:
    a pad layer;
    a dopant-containing aluminum layer overlying the pad layer, the dopant being selected from a group consisting of neodymium, tantalum, cobalt, nickel, chromium, molybdenum, and titanium or combination thereof, and having a concentration of 0.01 wt % to 2 wt %; and
    a protective layer overlying the dopant-containing aluminum layer.

13. The micromirror for micro-electro-mechanical systems as claimed in claim 12, further comprising a pure aluminum layer under the dopant-containing aluminum layer.

14. The micromirror for micro-electro-mechanical systems as claimed in claim 12, further comprising a pure aluminum layer overlying the doped aluminum layer.

15. The micromirror for micro-electro-mechanical systems as claimed in claim 14, wherein the pure aluminum layer is contacted with the dopant-containing aluminum layer.

16. The micromirror for micro-electro-mechanical systems as claimed in claim 12, further comprising two pure aluminum layers so that the dopant-containing aluminum layer is interposed between the pure aluminum layers.

17. The micromirror for micro-electro-mechanical systems as claimed in claim 12, wherein the dopant-containing aluminum layer has a thickness of about 2000 angstroms to 3000 angstroms.

18. The micromirror for micro-electro-mechanical systems as claimed in claim 12, wherein the protective layer is a titanium layer or a titanium nitride layer, or a composite layer comprising titanium and titanium nitride.

19. The micromirror for micro-electro-mechanical systems as claimed in claim 12, wherein the protective layer has a thickness of about 100 angstroms to 800 angstroms.

20. The micromirror for micro-electro-mechanical systems as claimed in claim 12, wherein the pad layer comprises an oxide layer and has a thickness of about 300 angstroms to 500 angstroms.

* * * * *